(12) United States Patent
Kawamoto et al.

(10) Patent No.: US 11,047,492 B2
(45) Date of Patent: Jun. 29, 2021

(54) BALL VALVE

(71) Applicant: TOFLO CORPORATION, Hino (JP)

(72) Inventors: Takahiro Kawamoto, Hino (JP); Takuo Simada, Hino (JP); Michihiro Ogawa, Hino (JP)

(73) Assignee: TOFLO CORPORATION, Tokyo (JP)

( * ) Notice: Subject to any disclaimer, the term of this patent is extended or adjusted under 35 U.S.C. 154(b) by 0 days.

(21) Appl. No.: 16/419,407

(22) Filed: May 22, 2019

(65) Prior Publication Data

US 2020/0124190 A1    Apr. 23, 2020

(30) Foreign Application Priority Data

Oct. 17, 2018 (JP) .............................. JP2018-195963

(51) Int. Cl.
*F16K 11/087* (2006.01)
*F16K 5/06* (2006.01)
*F16K 31/05* (2006.01)
*F16K 5/20* (2006.01)

(52) U.S. Cl.
CPC ........ *F16K 11/0873* (2013.01); *F16K 5/0605* (2013.01); *F16K 5/0673* (2013.01); *F16K 5/201* (2013.01); *F16K 31/055* (2013.01)

(58) Field of Classification Search
CPC .. F16K 11/0873; F16K 5/0673; F16K 5/0605; F16K 5/201; F16K 31/055
See application file for complete search history.

(56) References Cited

U.S. PATENT DOCUMENTS

| | | | | |
|---|---|---|---|---|
| 2,117,907 A | * | 5/1938 | Ogden ..................... | E03B 7/08 137/337 |
| 3,033,227 A | * | 5/1962 | Goldman ............... | F16K 5/0642 137/328 |
| 3,219,055 A | * | 11/1965 | Dumm .................. | F16K 5/0678 137/315.2 |
| 3,241,808 A | * | 3/1966 | Allen .................... | F16K 5/0673 251/174 |
| 3,401,914 A | * | 9/1968 | Shand ................... | F16K 5/0673 251/172 |
| 3,408,038 A | * | 10/1968 | Scaramucci .......... | F16K 5/0673 251/175 |
| 3,414,233 A | * | 12/1968 | Priese ................... | F16K 5/0678 251/172 |
| 3,480,253 A | * | 11/1969 | Davies .................. | F16K 5/0673 251/174 |

(Continued)

FOREIGN PATENT DOCUMENTS

| | | |
|---|---|---|
| JP | H0560251 A | 3/1993 |
| JP | 2001-248745 A | 9/2001 |

(Continued)

*Primary Examiner* — Matthew W Jellett
*Assistant Examiner* — Christopher D Ballman
(74) *Attorney, Agent, or Firm* — Muncy, Geissler, Olds & Lowe, P.C.

(57) ABSTRACT

A ball valve includes a ball that has a passage hole and is rotatably supported, a ball packing that is made of polyimide and is in contact with an outer circumferential face of the ball, and a ball retainer that holds the ball packing, and a spring-loaded lip seal that is installed between the ball packing and the ball retainer and has a metallic spring fit inside a seal case made of a resin.

15 Claims, 6 Drawing Sheets

(56) References Cited

U.S. PATENT DOCUMENTS

| | | | | |
|---|---|---|---|---|
| 3,521,855 A * | 7/1970 | Jensen | F16K 5/0673 | 251/172 |
| 3,563,510 A * | 2/1971 | Priese | F16K 1/2266 | 251/173 |
| 3,576,309 A * | 4/1971 | Zawacki | F16K 5/0636 | 251/174 |
| 3,604,455 A * | 9/1971 | Therneau | F16K 24/02 | 137/583 |
| 3,642,248 A * | 2/1972 | Benware | F16K 1/2266 | 251/172 |
| 3,731,904 A * | 5/1973 | Valince | F16K 5/201 | 251/315.13 |
| 3,765,647 A * | 10/1973 | Grove | F16K 3/0227 | 251/317 |
| 4,034,959 A * | 7/1977 | Morrison | B23P 15/001 | 251/315.02 |
| 4,083,376 A * | 4/1978 | Alaniz | F16K 5/0673 | 137/246.22 |
| 4,113,231 A * | 9/1978 | Halpine | F16K 5/0673 | 251/174 |
| 4,137,936 A * | 2/1979 | Sekimoto | F16K 5/0673 | 137/246.22 |
| 4,262,688 A * | 4/1981 | Bialkowski | F16K 5/0663 | 137/242 |
| 4,286,614 A * | 9/1981 | Kacal | F16K 5/0673 | 137/246.22 |
| 4,319,734 A * | 3/1982 | Acar | F16K 5/201 | 251/174 |
| 4,477,055 A * | 10/1984 | Partridge | F16K 5/0673 | 137/328 |
| 4,572,239 A * | 2/1986 | Koch | F16K 11/0876 | 137/625.47 |
| 4,593,916 A * | 6/1986 | Laulhe | F16K 1/226 | 277/637 |
| 4,637,421 A * | 1/1987 | Stunkard | F16K 5/0636 | 137/327 |
| 4,658,847 A * | 4/1987 | McCrone | E06B 5/164 | 137/72 |
| 4,681,133 A * | 7/1987 | Weston | F16K 11/0655 | 137/315.18 |
| 4,718,444 A * | 1/1988 | Boelte | F16K 5/0636 | 137/15.22 |
| 4,911,408 A * | 3/1990 | Kemp | F16K 5/0673 | 251/174 |
| 5,052,657 A * | 10/1991 | Winship | F16K 5/06 | 166/324 |
| 5,181,539 A * | 1/1993 | Yokoyama | F16K 5/06 | 137/625.32 |
| 5,326,074 A * | 7/1994 | Spock, Jr. | F16K 41/046 | 251/214 |
| 5,338,003 A * | 8/1994 | Beson | F16K 3/205 | 251/172 |
| 5,360,036 A * | 11/1994 | Kieper | F16K 5/0605 | 137/315.18 |
| 5,533,738 A * | 7/1996 | Hoffmann | F16K 5/201 | 277/388 |
| 6,966,537 B2 * | 11/2005 | Sundararajan | F16K 3/0227 | 251/172 |
| 7,275,564 B2 * | 10/2007 | Bazin | F16K 5/201 | 137/625.47 |
| 7,849,695 B1 * | 12/2010 | Cover | F02K 9/805 | 60/242 |
| 7,988,127 B2 * | 8/2011 | Parra | F16K 27/067 | 251/172 |
| 8,186,371 B2 * | 5/2012 | Timko | F16K 5/0636 | 137/15.22 |
| 8,328,160 B2 * | 12/2012 | Abel | F16K 5/0689 | 251/174 |
| 8,375,977 B2 * | 2/2013 | Jones | F16K 5/0605 | 137/237 |
| 8,490,945 B2 * | 7/2013 | Keeper | F16K 5/205 | 251/172 |
| 8,500,090 B2 * | 8/2013 | Hubacek | F16K 5/20 | 251/171 |
| 8,733,733 B2 * | 5/2014 | Collison | F16K 5/0636 | 251/174 |
| 8,881,767 B2 * | 11/2014 | Bartell | F16K 11/0873 | 137/625.32 |
| 9,113,266 B2 * | 8/2015 | Lott | H04R 1/1058 | |
| 9,140,369 B2 * | 9/2015 | Dalluge | F16K 5/0678 | |
| 9,267,606 B2 * | 2/2016 | Haland | F16K 5/0678 | |
| 9,488,033 B2 * | 11/2016 | Buck | F16K 5/0689 | |
| 9,618,126 B1 * | 4/2017 | LaCroix | F16K 5/0673 | |
| 9,644,752 B2 * | 5/2017 | Nabors | F16K 5/0605 | |
| 9,657,848 B2 * | 5/2017 | Balan | F16K 5/0689 | |
| 9,915,359 B2 * | 3/2018 | Ricard | F16K 5/0689 | |
| 10,072,556 B2 * | 9/2018 | Maruyama | F01P 7/16 | |
| 2003/0111631 A1 * | 6/2003 | Gosling | F16K 5/201 | 251/315.01 |
| 2004/0164496 A1 * | 8/2004 | Okada | F02M 59/442 | 277/549 |
| 2004/0200988 A1 * | 10/2004 | Lorenz | F16K 5/0631 | 251/315.14 |
| 2004/0250862 A1 * | 12/2004 | Maruta | F16K 11/0873 | 137/625.47 |
| 2005/0104026 A1 * | 5/2005 | Tulaskar | F16K 27/067 | 251/315.01 |
| 2008/0169443 A1 * | 7/2008 | Loloff | F16K 11/0873 | 251/315.1 |
| 2008/0179558 A1 * | 7/2008 | Lloyd | F16K 5/0673 | 251/180 |
| 2011/0024662 A1 * | 2/2011 | Seveso | F16K 5/0673 | 251/315.08 |
| 2011/0147635 A1 * | 6/2011 | Seveso | F16K 5/201 | 251/315.08 |
| 2014/0203203 A1 * | 7/2014 | Scattini | F16K 5/201 | 251/317 |
| 2014/0299806 A1 * | 10/2014 | Hoffmann | F16K 5/0605 | 251/283 |
| 2015/0369377 A1 * | 12/2015 | Noble | F16K 27/067 | 251/315.01 |
| 2018/0030881 A1 * | 2/2018 | Carter | F01P 11/20 | |

FOREIGN PATENT DOCUMENTS

| | | |
|---|---|---|
| JP | 2003-035374 A | 2/2003 |
| JP | 2010-001964 A | 1/2010 |

* cited by examiner

Without Load      With Load Applied

BALL VALVE

TECHNICAL FIELD

This invention relates to a ball valve that adjusts the valve opening by the rotation of a ball to control the flow rate of a fluid.

BACKGROUND

In a conventional ball valve, fluororesin (PTFE) is known as a material for a sheet for sealing a ball (also called a ball packing). Fluororesin has lubricity and good sealability and is also superior in heat resistance and chemical resistance, therefore it is commonly used as a sheet material. However, fluororesin is poor in resilience, having a characteristic that once it is crushed, it maintains its crushed shape. Therefore, there is a shortcoming that even if a fluid is stopped with a crushed fluororesin sheet, the fluid leaks inside.

In order to solve this shortcoming of fluororesin sheets, there also is a sheet using modified fluororesin such as the one in Patent Document 1. However, although this sheet has improved characteristics in permanent deformation and compression creep, somewhat increasing its durability in comparison with fluororesin sheets, no fundamental solution is reached.

Also, there are examples of using a rubber O-ring along with a sheet as in Patent Documents 2, 3, and 4 in order to dissolve the shortcoming of the fluororesin sheet. These examples attempt to maintain the sealability of the sheet over a long period of time by constantly adding a tension with the O-ring. However, even these sheets have the following problems.

(1) Because the rubber O-ring also has a permanent deformation, it cannot be used semipermanently.

(2) For a fluid whose temperature is −50° C. or lower, the rubber itself loses its elasticity and becomes incapable of sealing.

(3) At high or low temperatures, its permanent deformation becomes severe, therefore it cannot be used over a long period of time. Also, rubber (especially, silicone or EPDM) that is the material of the O-ring has a large thermal expansion, thereby its resilience increases extremely at high temperatures and conversely decreases extremely at low temperatures, therefore it is not suitable for use over a long period of time.

(4) When using a fluorine-based liquid, fluorine rubber swells extremely, and thus cannot be used.

(5) Although the reason for using an O-ring along with a sheet is to provide the sheet with functions to add a tension and prevent internal leaking, because these two functions are simultaneous performed, it cannot endure use in adverse conditions (in terms of temperature and the kind of fluid), and thus is not suitable for use over a long period of time. For example, temperature of a fluorine-based liquid used for the temperature adjustment of semiconductor manufacturing equipment is −80° C.~+200° C., that is use in a severe environment accompanied with rapid temperature changes, and the fluororesin sheet swells with the fluorine-based liquid, significantly decreasing its sealability.

Also, concerning the above-mentioned problem (5), if a ball valve is stopped in a state of having an intermediate valve opening (such as 30%) and is left for a long period of time in an environment of a high-temperature fluorine-based fluid, in the case where the sheet (ball packing) is a fluororesin (such as PTFE), the part with which the ball is in contact does not swell because a strong tension is applied, and only the part with which the ball is not in contact expands by swelling, forming a step on the ball packing. Afterwards, in changing the valve opening, a sliding torque to move the ball increases rapidly when going over this step and becomes larger than an actuator torque, thereby the ball cannot be moved, generating an operation failure, that is a problem.

Note that considered as relevant causes of this sliding torque generation are A) swelling of the ball packing, B) thermal expansion of the ball packing, C) a step on the slope of the ball packing, and D) thermal expansion of the O-ring.

In the case of A) where the ball packing swelled, as shown in FIG. 8A, the O-ring is compressed, increasing a crushing margin. Accordingly, due to an increase in the resilience of the O-ring, the pressing force of the ball packing increases, therefore the sliding torque increases.

In the case of B) where the ball packing thermally expanded, as shown in FIG. 8B, the O-ring is compressed in the same manner as in swelling, increasing the crushing margin. Accordingly, due to an increase in the resilience of the O-ring, the pressing force of the ball packing increases, therefore the sliding torque increases.

In the case of C) where a step occurred on the slope of the ball packing, as shown in FIG. 8C, in changing the valve opening it is necessary to go over the step, and the ball packing moves outwards when going over it. Therefore, as a result it compresses the O-ring, and its resilience increases, thereby the sliding torque increases.

In the case of D) where the O-ring thermally expanded, as shown in FIG. 8D, the O-ring thermally expands as the fluid temperature rises, and its resilience increases, thereby the sliding torque increases. Especially, silicone rubber that is the raw material of the O-ring has a large coefficient of thermal expansion.

RELATED ART

[Patent Doc. 1] JP Laid-Open Application Publication 2003-35374

[Patent Doc. 2] JP Laid-Open Application Publication H5-60251

[Patent Doc. 3] JP Laid-Open Application Publication 2001-248745

[Patent Doc. 4] JP Laid-Open Application Publication 2010-1964

This invention has been made considering such problems as the above, and its objective is to offer a ball valve that is excellent in sealability and durability and is suitable for use in a severe environment accompanied with rapid temperature changes.

SUMMARY

In order to deal with the problem, a ball valve, disclosed in the application, includes a ball that has a passage hole and is rotatably supported, a ball packing that is made of polyimide and is in contact with an outer circumferential face of the ball, and a ball retainer that holds the ball packing, and a spring-loaded lip seal that is installed between the ball packing and the ball retainer and has a metallic spring fit inside a seal case made of a resin.

In the ball valve above, a superfine O-ring may be installed on an outer circumferential face of the lip seal.

The ball valve above may include another metallic spring that is made of a metal, and the metallic spring is installed on a side face on the ball retainer side of the lip seal.

In the ball valve above, a tapered face may be installed on the ball retainer that is in contact with the lip seal.

In the ball valve above, the ball valve may be a two-way valve having two holes that are a penetration hole and an ejection hole, and the penetration hole communicates with a passage hole of the ball, and the ejection hole ejects a liquid pooled in the passage hole of the ball from the penetration hole into the outflow passage, the ejection hole being disposed on the outflow passage side of the ball packing.

The ball valve above may include a heat-insulating extension shaft that is made of zirconia. The ball valve is an electrically-powered valve, and the heat-insulating extension shaft is installed between a shaft and an actuator of the ball.

The ball valve above may include a series spring that is made by alternately stacking V-packings sealing the shaft and multiple disc springs pressing the V-packings. The series spring is installed on the outer circumference of the shaft of the ball.

According to this invention, because the ball packing is configured of polyimide, it is hard to swell even if it touches a fluorine-based liquid, therefore it is also hard to deform. Furthermore, because the coefficient of thermal expansion of polyimide is also small, variation in the distance between the ball and the ball packing is also hard to occur, being stable over a long period of time. Therefore, it is the most suitable for the ball packing part that requires mechanical strength. Also, in the conventional O-ring system, the tension changed due to thermal expansion depending on the temperature range that it was used. Especially at low temperatures the sealability worsened. Furthermore, over a long term the sealability decreased due to degradation by a permanent distortion. However, according to this invention, by adopting a seal structure with a spring-loaded lip seal and having a metallic spring bear the function to apply a tension, there is little temperature dependence or degradation due to a permanent distortion as with an O-ring. Therefore, it can maintain stable sealability over a long period of time.

BRIEF DESCRIPTION OF THE DRAWINGS

In FIGS. 3B, 3C, reference R with a blanket, which is shown as (R), means a resilience (or resilience force). The direction of resilience is indicated with arrows.

DETAILED DESCRIPTION OF THE PREFERRED EMBODIMENT(S)

Below, an embodiment of this invention is explained referring to drawings.

Figure 1:
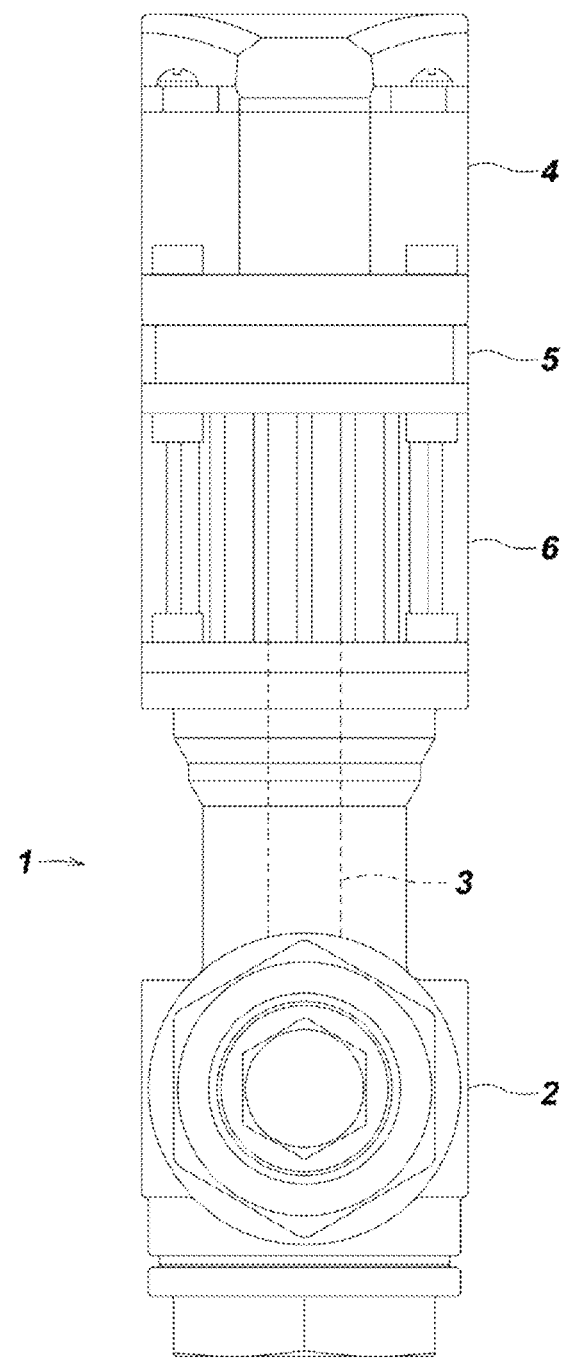
FIG. 1 is a left side view showing the external appearance of a ball valve of this invention.

As shown in FIG. 1, a ball valve 1 of this embodiment is an electrically-powered proportional control valve that drives a valve element 3 built in a valve body 2 with the electric power of an actuator 4 and controls the flow rate of a fluid with a valve opening that is proportional to its electric power. As the application of this ball valve 1, it can be used as a valve to adjust the flow rate of a fluorine-based inert liquid used as a thermal medium for adjusting temperature in liquid crystal or semiconductor manufacturing equipment for example. Also, because the actuator 4 is attached to a motor bracket 5 and connected to the valve body 2 through a heat-insulating extension bracket 6 made of a PPS resin, its compact design can save space, making it suitable for use in a semiconductor clean room. Note that having adopted the following characteristic structure, this ball valve 1 can deal with fluids of a wide temperature range from extremely low −80° C. to extremely high +200° C. in fluid temperature at least.

Figure 2:
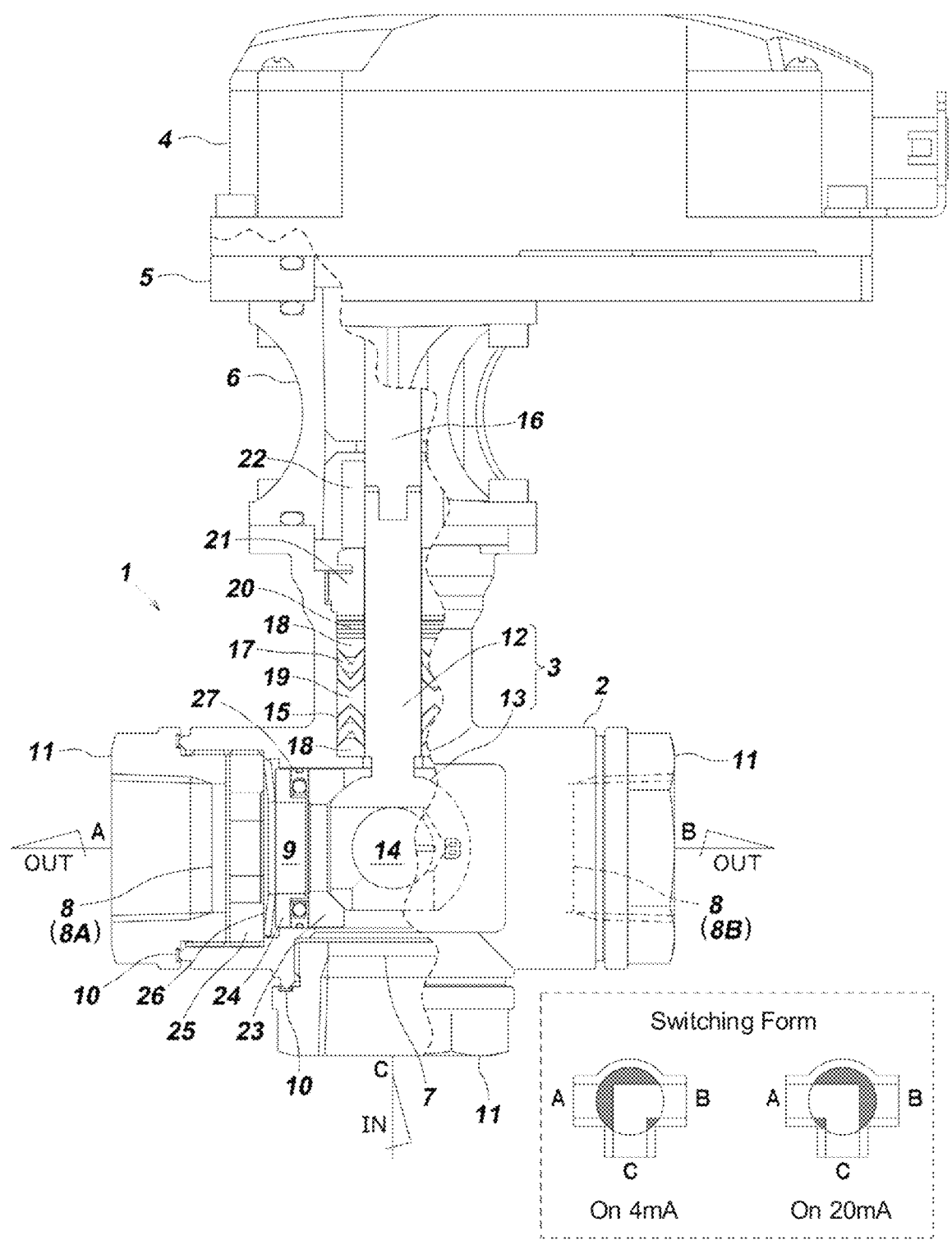
FIG. 2 is a partial cross-sectional view showing the internal structure of the valve.

As shown in FIG. 2, the ball valve 1 of this embodiment is provided with a metallic valve body 2 made of stainless cast steel (such as SCS13), and is a three-way (flow-dividing) type valve that selectively switches a flow from an inflow port 7 opened to the lower end of a pipe section to one of an outflow port 8 opened to the left end the pipe section (first outflow port 8A) and an outflow port 8 opened to the right end of the pipe section (second outflow port 8B). Provided inside the pipe of the valve body 2 is a fluid passage 9 where a fluid flows, communicating from the inflow port 7 to the first outflow port 8A or the second outflow port 8B. Also, connected to each of the inflow port 7, the first outflow port 8A, and the second outflow port 8B is a piping adapter 11 through a metal seal (such as SUS304) 10.

Installed on the fluid passage 9 inside the valve body 2 is the valve element 3 that functions as a flow rate adjusting mechanism. The valve element 3 comprises a metallic shaft 12 made of stainless steel (such as SUS304), and a ball 13 that is integrally installed on the tip of the shaft 12, blocks the fluid passage 9, and is rotatably supported. Also, formed penetrating the center of the ball 13 is a passage hole 14 that communicates with the fluid passage 9 when the valve is open. Note that as shown in a switching form, the passage hole 14 is an L-shaped port that selectively switches between the port A (first outflow port 8A) and the port B (second outflow port 8B) by inputting a switching signal for the rotation direction of the ball 13.

Formed on the upper part of the pipe section of the valve body 2 is an axial hole 15 that vertically penetrates the valve body 2 to the flow passage 9. To this axial hole 15, a shaft 12 of the valve element 3 is slidably fit in. Also, the upper end part of the shaft 12 is connected to a heat-insulating extension shaft 16, and the heat-insulating extension shaft 16 is connected to the motor rotation shaft (not shown) of the actuator 4. In this embodiment, because the heat-insulating extension shaft 16 is configured of a heat-resistant ceramic material made of zirconia, it has a function to cut off transmission of heat of the shaft 12 to the actuator 4 while suppressing the whole within a compact height. Note that although not shown, the actuator 4 includes a stepping motor, a decelerating mechanism, and a position detecting sensor.

In a space between the shaft 12 and the axial hole 15, a V-packing 17 made of fluororesin (PTFE) is held sandwiched between metallic upper and lower packing glands 18 and 18 and a middle packing gland 19 made of stainless steel (such as SUS304). Also, installed on the upper part of the upper and lower packing glands 18 is a series spring 20 made by alternately stacking multiple metallic disc springs up and down, and the series spring 20 is held pressed from the top by a shaft retainer 21 and a collar 22 installed on it. Therefore, because the V-packing 17 is constantly pressed with a large load by the series spring 20 in spite of a short stroke, durability can be improved while securely sealing the outer circumferential space of the shaft 12 in spite of its oil-free specification.

The flow rate adjusting mechanism is provided with a pair of ball packings 23 and 23 that contact with the outer circumferential face of the ball 13 and are disposed on the first outflow port 8A side and the second outflow port 8B side sandwiching the ball 13. In this embodiment, because the ball packing 23 is configured of a super engineering plastic material made of polyimide, even in contact with a fluorine-based liquid, little swelling or deformation occurs, and its shape can be stably maintained over a long period of time. Also, by adopting polyimide whose coefficient of thermal expansion is small as the material of the ball packing 23 and setting its with (thickness) small, obtained are effects that the width-direction thermal expansion is suppressed and that the sliding torque easily stabilizes, therefore fluids of a wide temperature range from extremely low temperatures to high temperatures can be used without any problem.

Installed outside the ball packing 23 is a metallic ball retainer 24 made of stainless steel (such as SUS304). This ball retainer 24 is fixed to the valve body 2 with a metallic retainer lock 25 made of stainless cast steel (such as SCS13), and holds the pair of ball packings 23 and 23 from both the right and left sides. Note that a metallic disc spring 26 is inserted between the ball retainer 24 and the retainer lock 25 for safety.

Figure 3A:
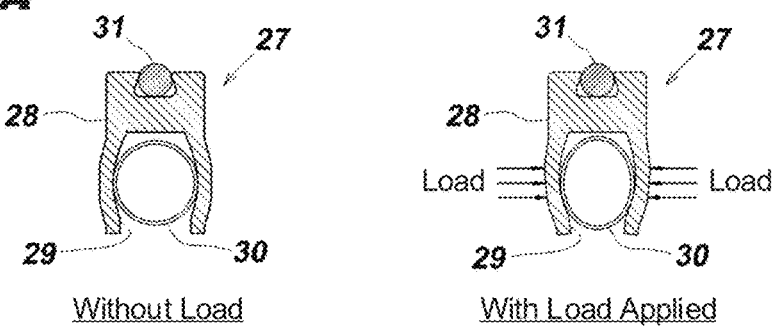
FIGS. 3A-3C are expanded cross-sectional views showing a lip-seal structure in the valve.

Installed between the ball packing 23 and the ball retainer 24 is a spring-loaded lip seal 27. As shown expanded in FIG. 3A, the lip seal 27 of this embodiment comprises a ring-shaped seal case 28 made of a heat-resistant resin such as fluororesin (PTFE), a metallic spring 30 that has a hollow spiral shape and is fit in a recessed part 29 inside the seal case 28, and a superfine O-ring 31 made of silicone rubber (Si) that is embedded on the outer circumferential face of the seal case 28. By adopting this seal structure with the spring-loaded lip seal 27, they can respectively bear two functions (a function to apply a tension to the ball packing 23, and a function to prevent internal leaking from a space between the ball packing 23 and the ball retainer 24 to the fluid passage 9) of the conventional O-ring. Note that the material of the seal case 28 is not limited to fluororesin (PTFE) but can be a super engineering plastic material such as polyimide or polyamideimide. Also, the material of the superfine O-ring 31 is not limited to silicone rubber (Si) but can be ethylene propylene rubber (EPDM) or hydrogenated nitrile rubber (HNBR).

Figure 3B:
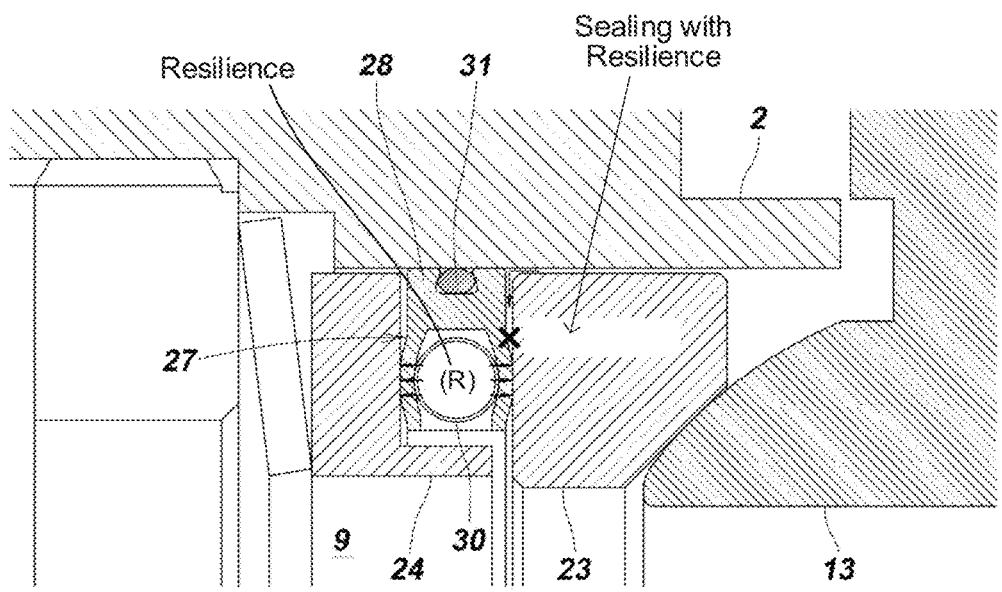
Figure 3C:
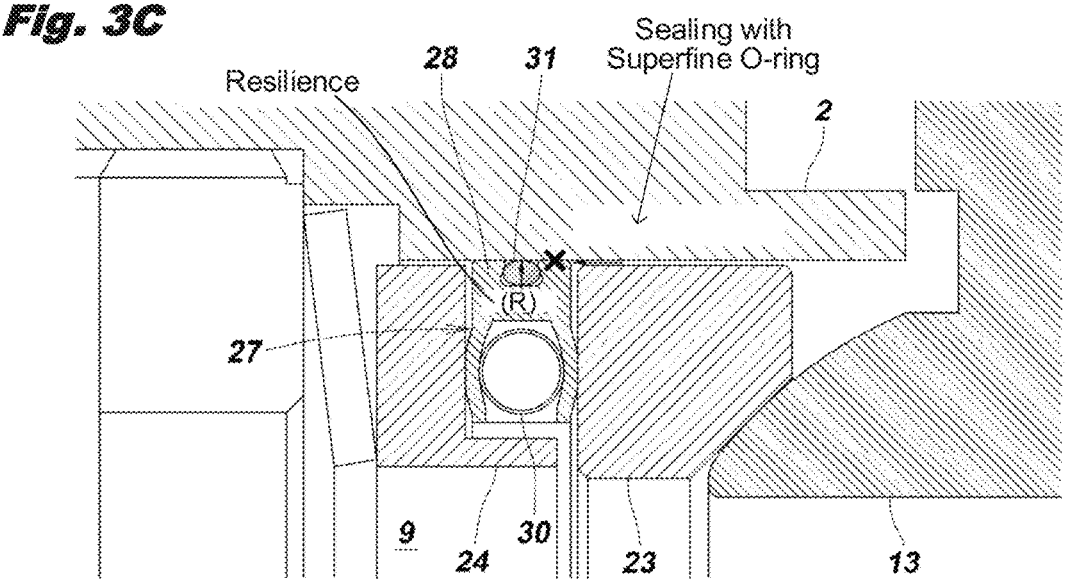

When a load is applied from outside the seal case 28, the metallic spring 30 crushes and gains resilience against the load, and as shown in FIG. 3B, presses the ball packing 23 against the outer circumference of the ball 13 with its resilience, thereby applying a tension. Therefore, a liquid leaking to the inside of the ball packing 23 can be securely sealed. On the other hand, as shown in FIG. 3C, the superfine O-ring 31 made of silicone rubber seals by closely contacting with a wall face inside the flow passage 9 of the valve body 2 with its resilience. Therefore, internal leaking from the outside to the fluid passage 9 can be prevented. Note that the structure is such that the influence of thermal expansion is reduced by making the wire diameter of the superfine O-ring 31 as thin as about 1 mm, and that even if it thermally expands in the width direction, it is hard to be influenced by a sliding torque by disposing it outside.

Figure 4A:
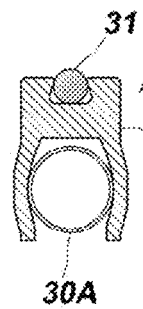
FIGS. 4A-4D are expanded views showing variation examples of the spring shape of the lip seal.
Figure 4B:
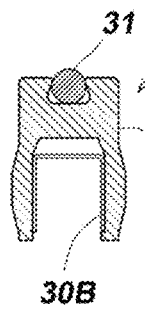
Figure 4C:
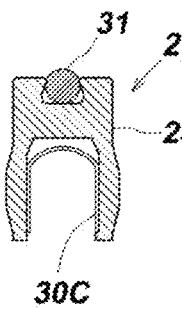
Figure 4D:
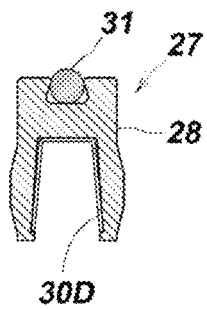

Here, as the shape of the spring 30 constituting the lip seal 27, various modification examples can be considered. For example, other than the spring 30A in a hollow spiral shape as in FIG. 4A, a spring 30B with a square U-shaped cross section as in FIG. 4B, a spring 30C with a U-shaped cross section as in FIG. 4C, a spring 30D made by folding a thin metallic sheet into a V-shaped cross section as in FIG. 4D, etc. can be adopted. Note that the shape of the spring 30 is not limited to these shapes as far as it can press the ball packing 23 with its resilience.

Figure 5:
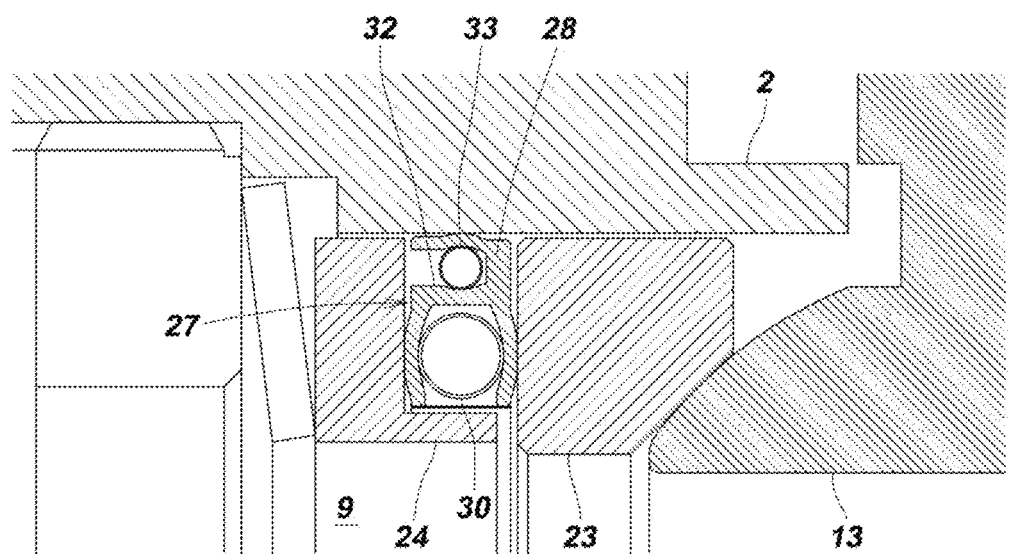
FIG. 5 is an expanded view showing a modification example where a compact spring is added to the lip seal.

Also, as the mode of the lip seal 27, the following modification examples can be considered. For example, substituting for the superfine O-ring 31 in FIG. 3, a structure can be adopted as shown in FIG. 5 where a recessed groove 32 is installed on the side face on the ball retainer 24 side of the seal case 28, and a metallic compact spring 33 that is separate from the above-mentioned spring 30 can be fit in this recessed groove 32. By the lip seal 27 of such structure as this, by the resilience of the compact spring 33 the seal case 28 made of fluororesin (PTFE) is pressed against the inner wall of the valve body 2 into a close contact, thereby preventing internal leaking to the fluid passage 9.

Figure 6:
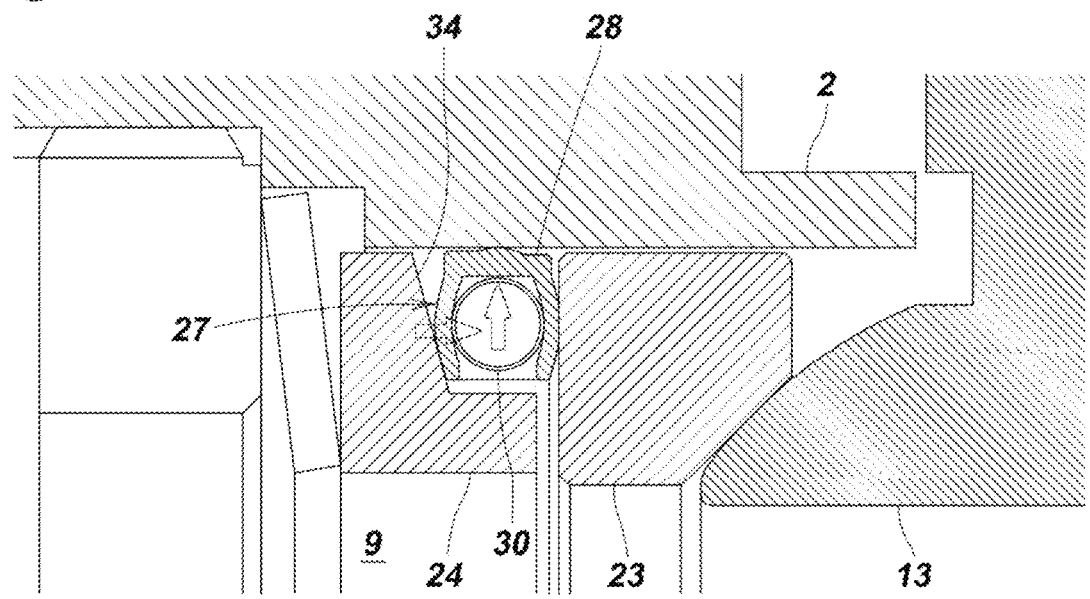
FIG. 6 is an expanded view showing a modification example where a tapered face is installed on a ball retainer.

Also, by omitting the superfine O-ring 31 in FIG. 3, a structure can be adopted as shown in FIG. 6 where the lip seal 27 is given the spring 30 fit in the recessed part 29 inside the seal case 28, and a tapered face 34 whose width narrows from the inner circumference toward the outer circumference is installed on the side face with which the lip seal 27 of the ball retainer 24 contacts. By such structure as this, the lip seal 27 can apply tensions in two directions of the valve body 2 (vertical) direction and the ball packing 23 (horizontal) direction as indicated with arrows in the figure, and the vertical-horizontal tension ratio can also be adjusted by the angle of the tapered face 34. Also, the same effect as the superfine O-ring 31 can be obtained with the single spring 30 only, therefore a cost reduction can be achieved by omitting the superfine O-ring 31, and it can be stably used at −50° C. or lower.

Figure 7:
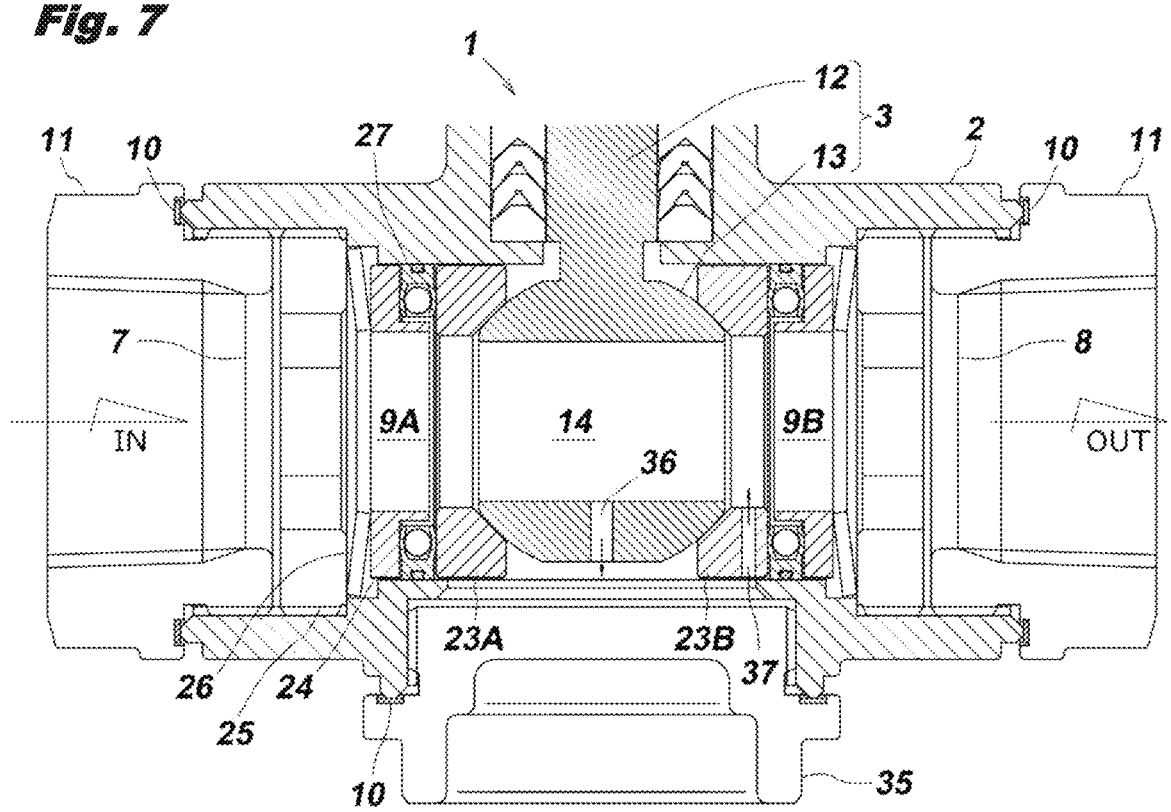
FIG. 7 is a partial cross-sectional view showing an ejection structure for a liquid pooled in a passage hole of a ball.
Figure 8A:
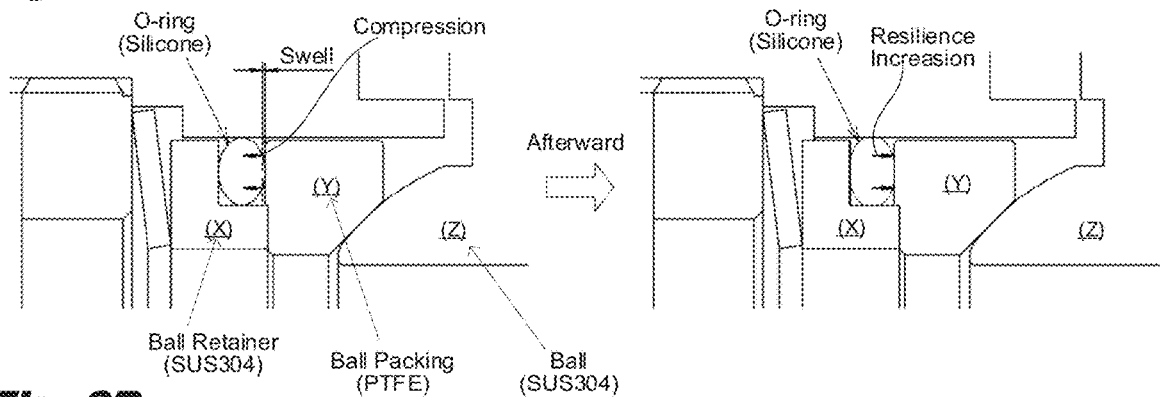
FIGS. 8A-8D are explanatory diagrams showing causes of generating a sliding torque in the conventional ball valve. In these drawings, (X) means "Ball Retainer (SUS304), (Y) means "Ball Packing (PTFE)" and (Z) means "Ball (SUS304)."
Figure 8B:
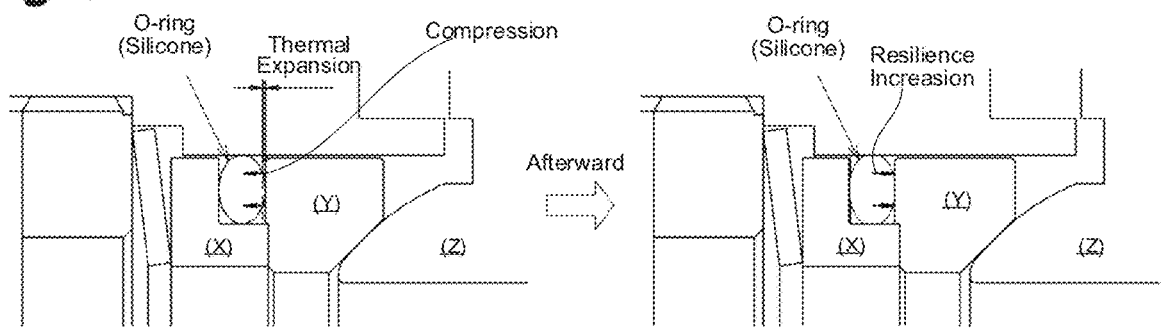
Figure 8C:
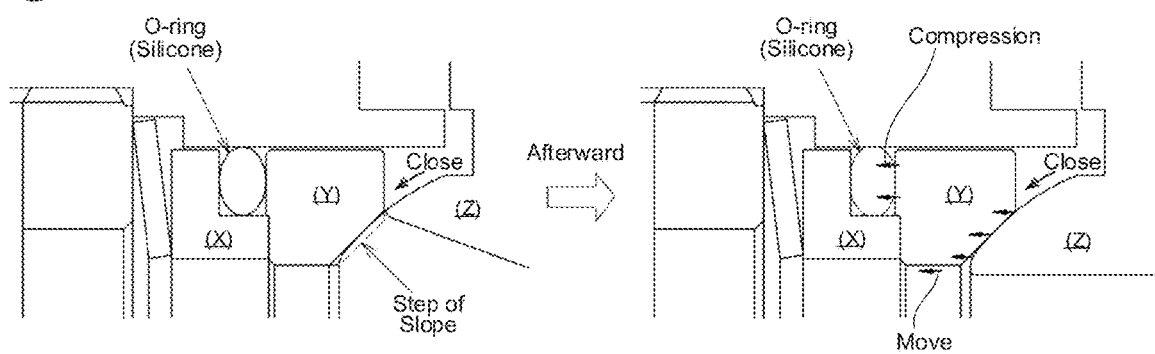
Figure 8D:
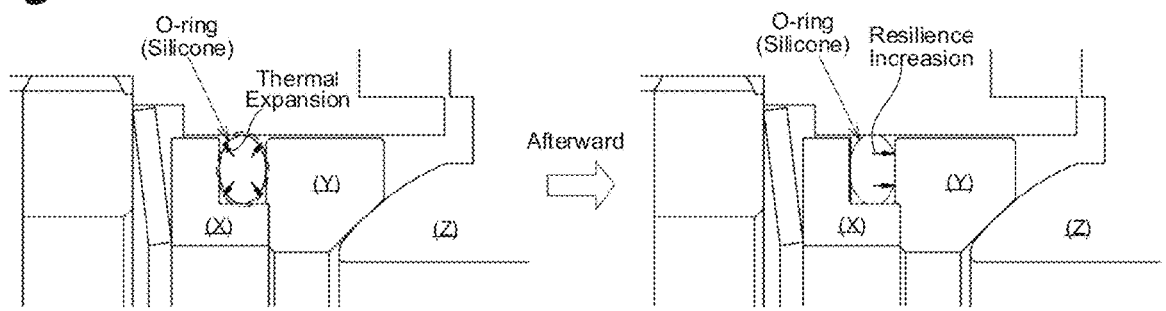

Furthermore, the flow rate adjusting mechanism may be provided with a function to eject a liquid pooled in the passage hole 14 of the ball 13. The ball valve 1 shown in FIG. 7 is a two-way type valve where the lower end of the pipe section of the valve body 2 blocked with a plug adapter 35 to which a stop plug is fit in, and a liquid flows from the inflow port 7 opened to the left end of the pipe section to the outflow port 8 opened to the right end of the pipe section. In the case of such two-way valve as this, a fluorine-based liquid pooled inside the valve body 2 has a high coefficient of thermal expansion, and therefore may expand due to a temperature difference when returning from extremely low temperature of −80° C. to the normal temperature of +20° C., possibly causing the product to deform.

Then, as shown in FIG. 7, installed in this embodiment are a penetrating hole 36 that communicates from the lower end face of the ball 13 to the passage hole 14, and an ejection hole 37 connecting from the lower end face of the ball packing 23B on the outflow port side to the outflow passage 9B. By this ejection structure, once the communication between the inflow passage 9A and the outflow passage 9B is blocked by the ball 13 in closing the valve, a liquid pooled in the passage hole 14 of the ball 13 leaks from the penetrating hole 36 through the ejection hole 37 to the outflow passage 9B, thereby it can be ejected from the outflow port 8 to the outside of the valve. Note that because there is no hole opened on the ball packing 23A on the inflow port 7 side, securely sealing with the ball 13, no liquid leaks from the penetrating hole 26 to the inflow passage 9A.

As explained above, according to the ball valve 1 of this embodiment, the ball packing 23 that seals the ball 13 of the valve element 3 is configured of polyimide that is hard to swell even in contact with a fluorine-based liquid, and therefore it is also hard to deform. Furthermore, because the coefficient of thermal expansion of polyimide is also small, the distance between the ball 13 and the ball packing 23 is hard to vary, being stable over a long period of time. Therefore, it is the most suitable for the ball packing 23 part that requires mechanical strength. Also, according to this ball valve 1, by adopting a seal structure with the spring-loaded lip seal 27 and having the metallic spring 30 bear the function to apply a tension, there is little temperature dependence, and no degradation occurs due to such a permanent distortion as in the conventional O-ring. Therefore, stable sealability can be maintained over a long period of time.

Although listed as an application of this invention in the above-mentioned embodiment was an example of utilizing it as a valve to adjust the flow rate of a fluorine-based inert liquid used as a thermal medium for adjusting temperature in liquid crystal or semiconductor manufacturing equipment, other than that, it can also be utilized as a valve for adjusting the flow rate of hydraulic equipment, etc. Also, although listed was an example of applying it to an electrically-powered ball valve, it can also be applied to a pneumatic or manual ball valve.

LEGENDS

1: Ball valve
2: Valve body
3: Valve element
4: Actuator
5: Motor bracket
6: Heat-insulating extension bracket
7: Inflow port
8: Outflow port
8A: First inflow port
8B: Second inflow port
9: Fluid passage
9A: Inflow passage
9B: Outflow passage
10: Metal seal
11: Piping adapter
12: Shaft
13: Ball
14: Passage hole
15: Axial hole
16: Heat-insulating extension shaft
17: V-packing
18: Upper and lower packing glands
19: Middle packing gland
20: Series spring
21: Shaft retainer
22: Collar
23: Ball packing
23A: Inflow port side ball packing
23B: Outflow port side ball packing
24: Ball retainer
25: Retainer lock
26: Disc spring
27: Lip seal
28: Seal case
29: Recessed part
30: Spring
31: Superfine O-ring
32: Recessed groove
33: Compact spring
34: Tapered face
35: Plug adapter
36: Penetrating hole
37: Ejection hole

What is claimed is:

1. A ball valve, comprising:
    a ball that has a passage hole and is rotatably supported;
    a ball packing that is made of polyimide and is in contact with an outer circumferential face of the ball, the ball packing having a hollow thereinside
    a ball retainer that holds the ball packing; the ball retainer having a hollow thereinside wherein the hollows and the passage hole are connected to form a fluid passage through which the fluid flows,
    a valve body that has a hollow thereinside, the hollow being defined with an inner wall wherein the ball, the ball packing and ball retainer are accommodated in the valve body, and
    the ball packing intervenes between the ball and the ball retainer along the fluid passage,
    a spring-loaded lip seal that surrounds the fluid passage, is installed between the ball packing and the ball retainer and has a metallic spring fit inside a seal case made of a resin wherein the spring is entirely located on an imaginary plane that is perpendicular to the fluid passage, and
    a superfine O-ring that is in a ring shape having a hollow thereinside, surrounds the fluid passage, and is installed on the imaginary plane and on an outer circumferential face of the lip seal with respect to the fluid passage such that the spring is placed in the hollow of the O-ring and the O-ring is in direct contact with and pressed against the inner wall of the valve body.

2. The ball valve according to claim 1, wherein
    a tapered face is installed on the ball retainer that is in contact with the lip seal.

3. The ball valve according to claim 1, wherein
    the ball valve is a two-way valve having two holes that are a penetration hole and an ejection hole, and
    the penetration hole communicates with a passage hole of the ball wherein the fluid passage is defined with an inflow passage and an outflow passage, and the liquid flows in a flow direction passing through the passage hole from the inflow passage to the outflow passage of the ball packing, and
    one side of the ball packing where the inflow passage is located is defined as an inflow passage side, and the other side of the ball packing where the outflow passage is located is defined as an outflow passage,
    the ejection hole ejects the liquid pooled in the passage hole of the ball from the penetration hole into the outflow passage, the ejection hole being disposed on the outflow passage side of the ball packing.

4. The ball valve according to claim 1, further comprising:
    a heat-insulating extension shaft that is made of zirconia, wherein
    the ball valve is an electrically-powered valve, and
    the heat-insulating extension shaft is installed between a shaft and an actuator of the ball.

5. The ball valve according to claim 4, further comprising:
    a series spring that is made by alternately stacking V-packings sealing the shaft and multiple disc springs pressing the V-packings, wherein the series spring is installed on the outer circumference of the shaft of the ball.

6. The ball valve according to claim 1, wherein the O-ring is more distant from the fluid passage in a radial direction with respect to the fluid passage than the spring is.

7. The ball valve according to claim 1, wherein the spring is either a coil spring or a spring of which a cross sectional shape is U-letter, or V-letter.

8. The ball valve according to claim 1, wherein the fluid passage is defined to extend in X axis, and the imaginary plane is defined to extend in Y-axis and Z-axis, and each of the X, Y and Z axes is perpendicular to the other two axes.

9. The ball valve according claim 8, wherein the seal case is positioned to face the ball packing such that a portion of the seal case is deformed and pressed against the ball packing in the X-axis in correspondence with a deformation of the spring.

10. The ball valve according to claim 1, wherein the O-ring and the spring are coaxially arranged around the fluid passage.

11. A ball valve, comprising: a ball that has a passage hole and is rotatably supported;
a ball packing that is made of polyimide and is in contact with an outer circumferential face of the ball, the ball packing having a hollow thereinside
a ball retainer that holds the ball packing; the ball retainer having a hollow thereinside wherein the hollows and the passage hole are connected to form a fluid passage through which the fluid flows,
a valve body that has a hollow thereinside, the hollow being defined with an inner wall wherein the ball, the ball packing and ball retainer are accommodated in the valve body, and
the ball packing intervenes between the ball and the ball retainer along the fluid passage, a spring-loaded lip seal that surrounds the fluid passage, is installed between the ball packing and the ball retainer, having two seal cases made of a resin, the two seal cases being a first seal case and a second seal case wherein the first seal case accommodates a first spring, which is made of metal, thereinside and is positioned closer to the fluid passage than the second seal case, and the second seal case accommodates a second spring, which is made of metal, thereinside, wherein the first seal case is positioned to face the ball packing such that a portion of the first seal case is deformed and pressed against the ball packing in a direction along the fluid passage in correspondence with a deformation of the first spring, the second seal case is positioned to be in direct contact with the inner wall of the valve body such that an outer circumference portion of the second seal case with respect to the fluid passage is deformed and pressed against the inner wall of the valve body in a direction perpendicular to the fluid passage in correspondence with a deformation of the second spring.

12. The ball valve according to claim 11, wherein the first spring is located on an imaginary plane that is perpendicular to the fluid passage, surrounding the fluid passage, the second spring is located on the same imaginary plane as the first spring is.

13. The ball valve according to claim 12, wherein the fluid passage is defined to extend in X axis, and the imaginary plane is defined to extend in Y-axis and Z-axis, and each of the X, Y and Z axes is perpendicular to the other two axes.

14. The ball valve according to claim 11, wherein the first and second springs are either a coil spring or a spring of which a cross sectional shape is U-letter, or V-letter.

15. The ball valve according to claim 11, wherein the fluid passage penetrates through first spring and the second spring, and the first spring and the second spring are coaxially arranged around the fluid passage.

* * * * *